H. P. SIBERELL.
WHEEL TRUCK.
APPLICATION FILED SEPT. 1, 1915.
1,171,808.
Patented Feb. 15, 1916.
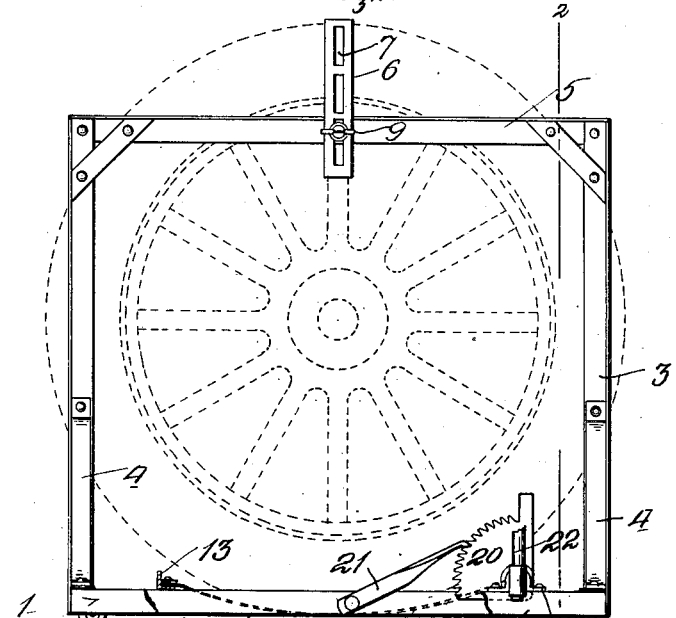
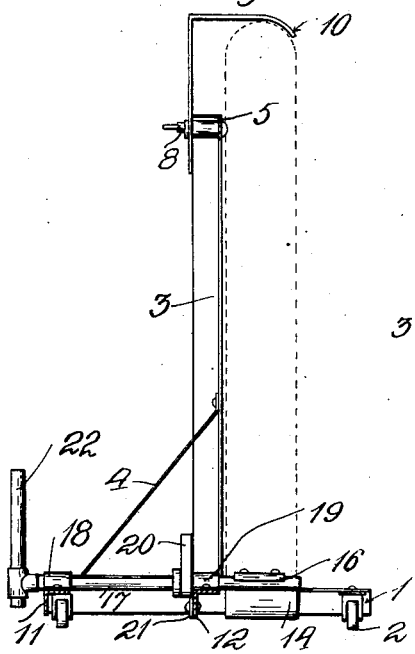
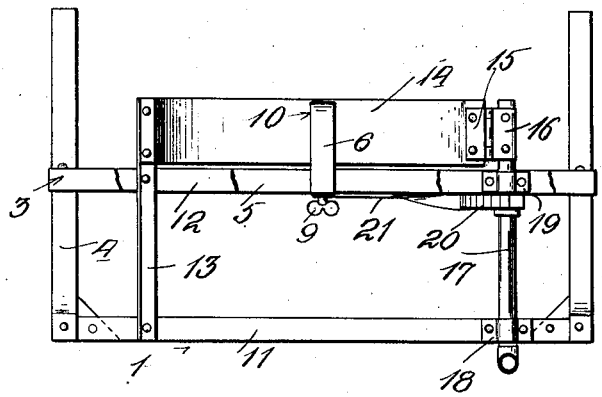
WITNESSES:
John Nathan
Frank Newnham
INVENTOR.
Harvey P. Siberell,
by
ATTORNEY.

UNITED STATES PATENT OFFICE.

HARVEY P. SIBERELL, OF GLENDALE, CALIFORNIA.

WHEEL-TRUCK.

1,171,808.  Specification of Letters Patent.  Patented Feb. 15, 1916.

Application filed September 1, 1915. Serial No. 48,550.

*To all whom it may concern:*

Be it known that I, HARVEY P. SIBERELL, a citizen of the United States, residing at Glendale, county of Los Angeles, and State of California, have invented a certain new and useful Wheel-Truck, of which the following is a specification.

My invention relates to a device for supporting wheels and has particular reference to an improvement over that class of trucks more fully set out in my co-pending application for patent filed July 12, 1915, Serial Number 40,789, an object of this invention being to provide a simple, light and cheap device which may be quickly set under a wheel without the necessity of elevating the wheel to any appreciable height and upon which the wheel may be firmly supported and moved about in the same position which it occupied before removal from an axle, thereby maintaining the center of the wheel on a plane parallel with the axle, and consequently facilitating replacement and removal of the wheel. These and other objects are accomplished by the device described in the specification following in connection with the accompanying drawing, in which, Figure 1 is a rear view. Fig. 2 is a section on line 2—2, Fig. 1, and Fig. 3 is a plan view.

With particular reference to the drawing, my invention comprises a three sided base 1, the fourth side being omitted to prevent interference with a wheel when placing the truck in position for use. At its corners the base is provided with casters or wheels 2, preferably of a swiveling nature. Rising centrally from and attached to the base, is a frame 3, supported rigidly in position by braces 4, centrally of the cross member 5 of the frame 3, is a clamping member 6, having slots 7, through which is arranged to extend a screw or other device 8, carrying a winged nut 9, for locking the clamping member in position of adjustment to a wheel, such clamping member being preferably curved as at 10, to conform to the curvature of a tire on a wheel and to more effectively hold the wheel on the base.

Rigidly secured to the connecting member 11, of the base and to a central reinforcing or bracing member 12, that connects the side members of the base, is a bar 13, which projects beyond said member 12, as shown. Onto the projected end of said bar 13, is riveted or otherwise secured a wheel support, consisting of a flexible strip 14, of any suitable material. The other end of said flexible strip 14, is riveted to the plate 15, of a hinge, the other plate 16 of which is secured to an oscillable rod 17, resting and held in place on the connecting member 11 and the bracing member 12, by straps 18 and 19, respectively. On the rod 17, is mounted a ratchet 20, which by engagement with a pawl 21, pivoted on said bracing member 12, holds the flexible strip in position of adjustment, which is effected by oscillation of the rod 17, through the medium of a lever 22, which may be inserted in a socket provided in the end of the rod. In practice, a wheel need be but slightly elevated from the ground to enable the flexible strip of the truck to be slid under it, hence the diversion of the wheel from a true vertical plane is so small that the center of the wheel will not be appreciably dislocated from true alinement with the axle from which the wheel has been removed.

What I claim, is:—

1. A truck comprising a base, a vertical frame on said base, a flexible wheel support on said base, and means on said frame coöperating with said flexible support to hold a wheel.

2. A truck comprising an open sided base, a frame on said base, a flexible wheel support on said base, a clamping member on said frame coöperating with said flexible support to hold a wheel, and means to tauten said flexible support.

3. A truck comprising an open sided base having casters, a wheel support on said base, means to adjust said support, a frame on said base, and means on said frame coöperating with said wheel support to hold a wheel.

4. A truck comprising an open-sided base having casters, a vertical frame on said base, a clamping member on said frame, a flexible wheel support rigidly secured at one end, and means connected to the other end of said flexible support to adjust same.

5. A truck comprising a base open at one side, a vertical frame on said base, a yielding wheel support on said base, means to adjust said support, and an adjustable means on said frame coöperating with said wheel support to hold a wheel.

6. A truck comprising an open sided base, a flexible adjustable wheel support on said base, a frame on said base, and means on said frame coöperating with said wheel support to hold a wheel.

In testimony whereof I affix my signature in the presence of two witnesses.

H. P. SIBERELL.

Witnesses:
ANTON GLOETZNER, Jr.,
E. L. STILWELL.